United States Patent [19]
Podszun et al.

[11] Patent Number: 6,069,227
[45] Date of Patent: May 30, 2000

[54] CURABLE COATINGS OF OLIGOMERIC CONDENSATION PRODUCTS

[75] Inventors: Wolfgang Podszun, Köln; Ludger Heiliger; Michael Mager, both of Leverkusen, all of Germany

[73] Assignee: Bayer A.G., Leverkusen, Germany

[21] Appl. No.: 09/150,414

[22] Filed: Sep. 9, 1998

[30] Foreign Application Priority Data

Sep. 10, 1997 [DE] Germany .......................... 197 39 640

[51] Int. Cl.⁷ .......................... C08G 63/02; C08G 63/12; C08G 63/18; C08G 63/66
[52] U.S. Cl. .......................... 528/272; 528/296; 528/298; 528/300; 528/301; 528/308; 528/308.6; 428/147; 428/412; 428/524
[58] Field of Search .......................... 528/272, 296, 528/298, 300, 301, 306, 308, 308.6; 428/147, 412, 524

[56] References Cited

U.S. PATENT DOCUMENTS

| | | | |
|---|---|---|---|
| 3,968,305 | 7/1976 | Oshima et al. | 428/334 |
| 4,879,402 | 11/1989 | Reiners et al. | 560/26 |
| 4,952,241 | 8/1990 | Reiners et al. | 106/35 |
| 4,952,614 | 8/1990 | Reiners et al. | 523/115 |
| 5,677,410 | 10/1997 | Mager et al. | 528/15 |
| 5,760,101 | 6/1998 | Heiliger et al. | 523/115 |

FOREIGN PATENT DOCUMENTS

| | | |
|---|---|---|
| 0274596 | 11/1987 | European Pat. Off. . |
| 0464485 | 6/1991 | European Pat. Off. . |
| 3703120 | 1/1980 | Germany . |
| 3703080 | 1/1988 | Germany . |
| 3703130 | 1/1988 | Germany . |
| 4040290 | 7/1992 | Germany . |
| 4338361 | 5/1995 | Germany . |
| 4440819 | 5/1995 | Germany . |
| 19603242 | 11/1996 | Germany . |
| 48-096515 | 12/1973 | Japan . |
| 80/00968 | 5/1980 | WIPO . |

OTHER PUBLICATIONS

Search Report For EP 98116836.2 (1998).

*Primary Examiner*—Nathan M. Nutter
*Attorney, Agent, or Firm*—Connolly Bove Lodge & Hutz LLP

[57] ABSTRACT

The present invention relates to curable coatings comprising oligomeric condensation products of aromatic tri- or tetra-carboxylic acids and dihydroxyalkyl (meth)acrylates.

12 Claims, No Drawings

CURABLE COATINGS OF OLIGOMERIC CONDENSATION PRODUCTS

The invention relates to curable coatings comprising oligomeric condensation products of aromatic tri- or tetra-carboxylic acids and dihydroxyalkyl (meth)acrylates.

Numerous coating materials are used for coating surfaces of plastics. Coating with acrylates or methacrylates, which can be cured thermally or photochemically, in many cases leads to good results. The advantages of acrylate coatings are their high transparency, good stability to weathering and good mechanical strength. UV-curable coatings for polycarbonate surfaces are described, for example, in the patent specifications U.S. Pat. No. 3,968,305 and WO 80/00968. EP-A 0 274 596 discloses acrylate coatings for surfaces of plastics which, in addition to conventional acrylate monomers, comprise UV adsorbers for UV protection.

EP-A 464 485 describes UV-curable coatings based on acrylates.

One disadvantage of the known acrylate coatings is their inadequate adhesive strength on surfaces of plastics.

The object of the present invention is therefore to provide a coating for surfaces of plastics which can be cured by radiation or heat and additionally allows an improved adhesion, with good optical and mechanical properties and a high stability to weathering.

It has now been found that curable coatings which have an outstanding adhesion on surfaces of plastics and furthermore a significantly improved ability for polymerization are obtained with the aid of oligomeric condensation products of aromatic tri- or tetracarboxylic acids and polyfunctional hydroxyalkyl (meth)acrylates.

Oligomeric condensation products of aromatic tri- or tetracarboxylic acids and polyfunctional hydroxyalkyl (meth)acrylates means those which can be derived from the following, monomers of the formula (I) and (II) under condensation reactions or an addition reaction.

The monomers correspond to the formula (I)

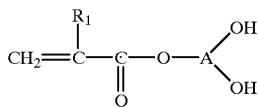

(I)

in which
  $R_1$ denotes hydrogen or methyl,
  A denotes a trivalent aliphatic radical having 3 to 15 C atoms, which can contain (additional) OH groups and up to 5 ether bridges,
and the formula (II)

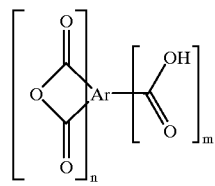

(II)

in which
  Ar represents a benzene ring or a naphthalene ring,
  n denotes the integer 1 or 2,
  m denotes 0, 1 or 2.

The aliphatic radical A in formula (I) can be linear, branched or cyclic. Linear or branched radicals are preferred.

Suitable aliphatic radicals A are e.g. the following:

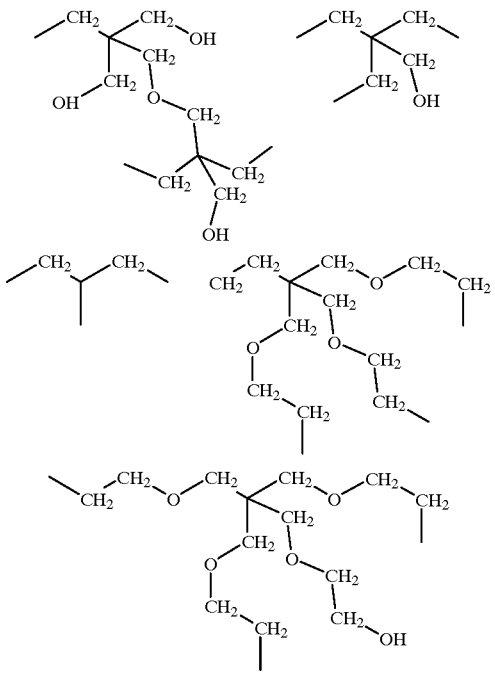

The following monomers of the formula (I), for example, may be mentioned specifically:

Table 1: Monomers (I)

| No. | |
|---|---|
| 1 | $CH_3$, $CH_2$ structure with $O$, $CH_2$, $CH_2$, $OH$, $OH$ |
| 2 | $CH_2$ structure with $O$, $CH_2$, $CH_2$, $OH$, $OH$ |
| 3 | Complex branched structure with multiple $CH_2$, $O$, $OH$ groups and methacrylate |

Examples which may be mentioned of monomers of the formula (II) are the monoanhydrides and dianhydrides of aromatic tri- and tetracarboxylic acids. The preferred monoanhydride is the trimellitic acid derivative 1,2,4-benzenetricarboxylic acid anhydride and 1,2,3-benzenetricarboxylic acid anhydride, and also the naphthalenetricarboxylic acid derivatives 1,2,6-, 2,3,6- and 1,4,5-naphthalenetricarboxylic acid anhydride.

Dianhydrides which are preferably employed are the commercially obtainable compound benzene-1,2,4,5-tetracarboxylic acid dianhydride (pyromellitic acid dianhydride) and naphthalene-1,4,5,8-tetracarboxylic acid dianhydride, or naphthalene-2,3,6,7-tetracarboxylic acid dianhydride, which is formed simply by dehydration from the known naphthalene-2,3,6,7-tetracarboxylic acid.

The molecular weights of condensates according to the invention are between 300 and 10,000 daltons, preferably between 500 and 7,500, particularly preferably between 1,000 and 5,000, and can be determined by the methods, known to the expert, of vapour pressure osmosis, HPLC and SFC (supercritical fluid chromatography).

For the preparation of condensation products according to the invention from tricarboxylic acid anhydrides, it may be favourable to employ not the tricarboxylic acid monoanhydrides themselves but the corresponding monoanhydride chlorides of the formula (IIa)

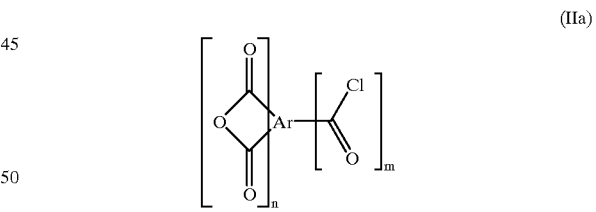

(IIa)

in which Ar has the abovementioned meaning and n and m are 1.

Monoanhydride chlorides which are preferably used are the commercially obtainable trimellitic acid derivative 1,2,4-benzenetricarboxylic acid anhydride chloride and 1,2,3-benzenetricarboxylic acid anhydride chloride, or the naphthalenetricarboxylic acid derivatives 1,2,6-, 2,3,6- and 1,4,5-naphthalenetricarboxylic acid anhydride chlorides. The condensation products according to the invention can thus be obtained by reaction of aromatic anhydride chlorides or dianhydrides with hydroxyalkyl (meth)acrylates.

Inorganic or organic bases can additionally be used as acid-trapping agents in the preparation of the condensation products according to the invention from monoanhydride chlorides of the formula (IIa).

Preferred inorganic bases are the weakly basic carbonates and bicarbonates of sodium and potassium. Preferred organic bases are tertiary amines, triethylamine and pyridine being particularly preferred. The bases are employed in a 0.05- to five-fold molar amount with respect to the anhydride, or the anhydride chloride, employed of the formula (II), a 2- to 3-fold molar excess being preferred. The organic bases additionally have a solubilizing action in this way.

As is known to the expert, for the preparation of oligomeric condensation products according to the invention, the monomers of the formulae (I) and (IIa) can be employed both in different and also in equimolar stoichiometric ratios, which then correspondingly lead to terminal anhydrides or hydroxides. Thus, for example, a ratio of monomer 1 to 1,2,4-benzenetricarboxylic acid anhydride chloride of greater than 1 to not more than 2 leads to a condensate with terminal anhydride groups, formula (III), which can then be hydrolysed to carboxyl groups, while a ratio of these monomers of less than 1 to a minimum of 0.5 leads to a condensate with terminal hydroxyl groups, formula (IV).

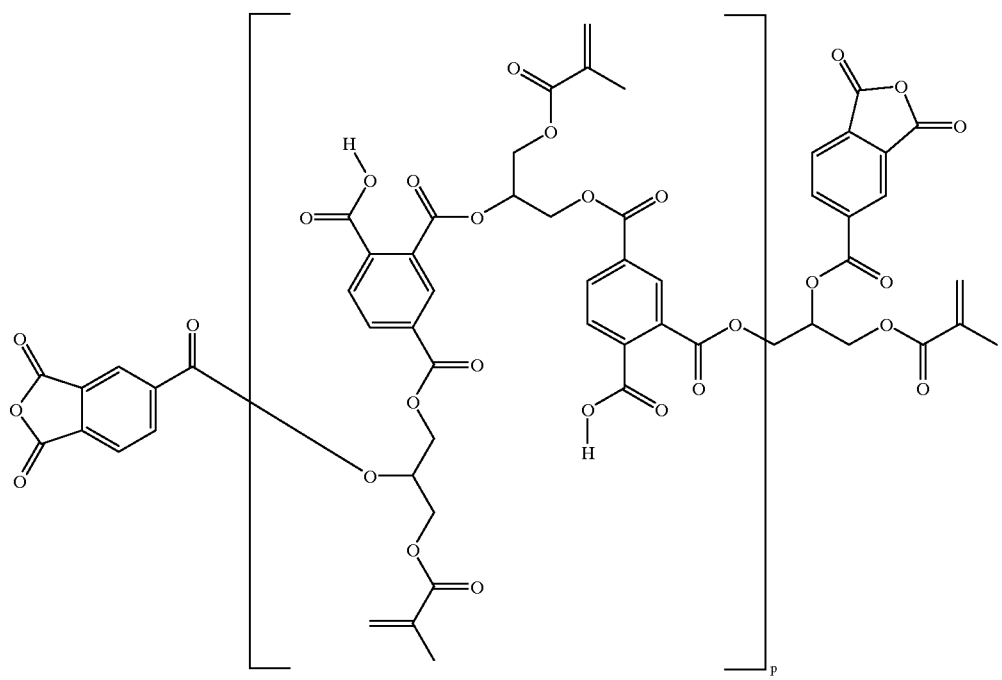

(III)

(IV)

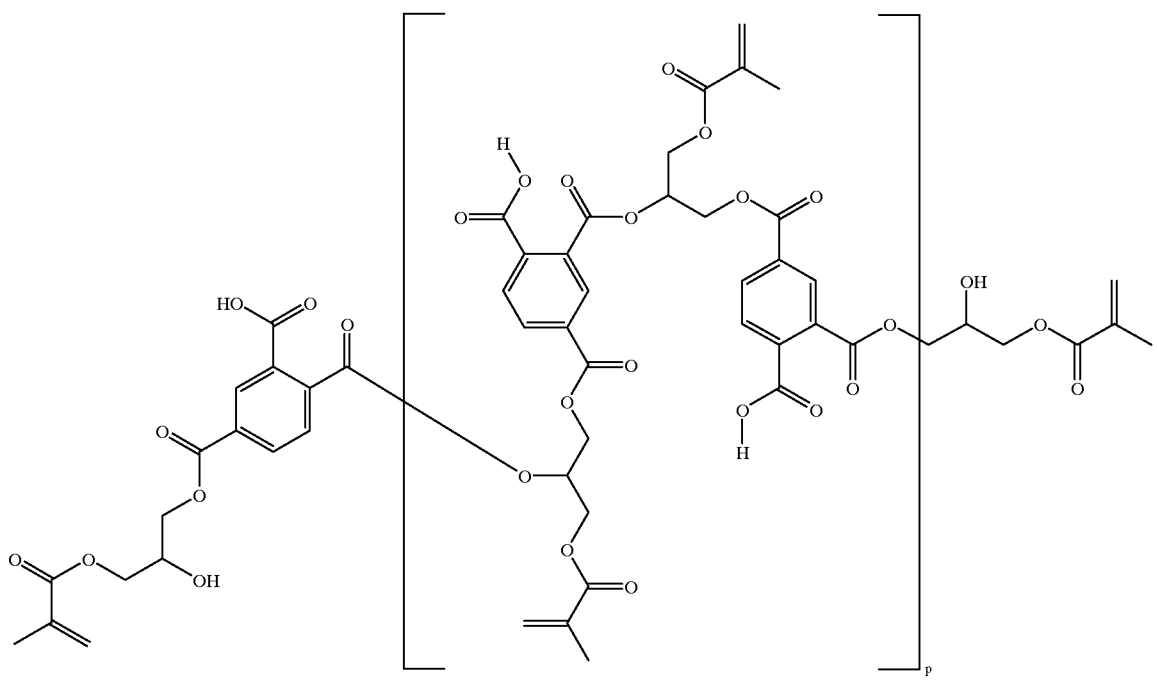

The recurring unit p is determined by the molecular weight, and in condensation products according to the invention is between 1 and 14.

At precisely equimolar ratios, hydroxyl and anhydride groups are formed, it being possible to control the condensation and molecular weight by hydrolysing the anhydride during the reaction, for example by addition of water.

The hydroxyalkyl (meth)acrylates according to formula (I) on which the oligomeric condensation products according to the invention are based are commercially available in some cases, or they can be prepared in a known manner by esterification of polyhydroxyalkyl compounds with e.g. (meth)acrylic acid chloride.

Instead of monomers 1 and 2 from Table 1, it is also possible for the epoxides 1a and 2a derived therefrom to be employed in an advantageous manner for the preparation of the condensation products according to the invention.

Epoxide 1a

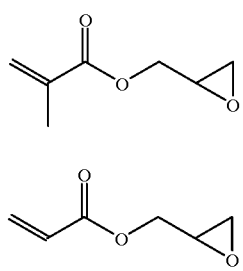

Epoxide 2a

According to a preferred synthesis route of the present invention, the tricarboxylic acid monoanhydrides are reacted with the epoxides 1a or 2a. In this synthesis route, it is particularly advantageous if the reaction is accelerated with a catalyst. Both Lewis and proton acids are suitable for this. The following may be mentioned as the catalyst: perchloric acid, sulfuric acid, trifluoromethanesulfonic acid, aluminium oxide, boron trifluoride, triphenylstibine and triphenylphosphine. The latter is particularly preferred.

The catalysts for the preparation according to the invention of oligomeric condensation products can be used in amounts of 1 ppm to equimolar amounts, based on the monomers of the formulae (I) or (II), depending on the activity under the particular reaction conditions. An amount of catalyst of 1,000 ppm to 10%, based on the monomers of the formulae (I) or (II), is preferably employed, particularly preferably 1,000 ppm to 1%.

It is expedient to control the heat of reaction originating from the reaction and the viscosity which builds up by means of an inert solvent. The preparation of the condensation products according to the invention is thus preferably carried out in an organic solvent. Suitable organic solvents are aprotic solvents, such as dioxane, tetrahydrofuran, N,N-dimethylformamide, N,N-dimethylacetamide, dimethylsulfonamide, butanone and acetone. Toluene and diethyl ether are preferably suitable. Xylene, methylene chloride, chloroform, butanone and methyl tert-butyl ether are particularly preferred.

A suitable temperature range for the preparation of the oligomers according to the invention is between −30 and 110° C. This reaction is preferably carried out at between −10 and 50° C., and particularly preferably between −5 and 30° C.

The corresponding terminal hydroxides or anhydrides are initially formed during, the preparation of the oligomers according to the invention. Dicarboxylic acids are accessible from the anhydrides by hydrolysis. The hydrolysis is carried out at temperature between 0 and 100° C., preferably between 20 and 50° C. The hydrolysis can be carried out both after isolation of the anhydrides or without isolation, by direct hydrolysis of the reaction mixture. To carry out this hydrolysis, water is added in an equimolar amount, but preferably in more than ten times the molar amount. The hydrolysis can be catalysed by controlled addition of acids, above all sulfuric acid, phosphoric acid, toluenesulfonic acid or acid ion exchangers, or by addition of bases, such as sodium hydroxide, carbonate or bicarbonate and potassium hydroxide, carbonate or bicarbonate.

The reactivity of compounds which can be cured by polymerization can be characterized very well by photo-DSC (differential scanning calorimetry). In this method, photoactivated samples are irradiated with an intense source of radiation, e.g. a halogen lamp with a heat protection filter, in a DSC apparatus (differential scanning calorimetry). The heat flow under irradiation is recorded as a function of time. Samples of the sample composition without a photoinitiator are employed as the reference. For the evaluation, the t-max value can be determined as a measure of the rate of reaction. t-Max is the time from the start of irradiation until the maximum reaction (maximum heat flow) is reached. The smaller the t-max, the greater the photoreactivity.

In addition to the condensation products of aromatic tri- or tetracarboxylic acids and dihydroxyalkyl (meth)acrylates, the curable coatings according to the invention comprise initiators and, if appropriate, coactivators and further (meth) acrylic acid esters as comonomers. Mixtures of different condensation products can also be employed, in particular, in the coatings according to the invention.

Initiators in the context of the present invention are agents which form free radicals and which induce a free-radical polymerization. Thermal initiators and photoinitiators, which induce a free-radical polymerization under the action of light, for example UV light, visible light or laser light, are suitable.

Examples of thermal initiators which may be mentioned are: peroxides, such as benzoyl peroxide, peresters, such as tert-butyl perpivalate, percarbonates, such as cyclohexyl percarbonate, and azo compounds, such as azoisobutyrodinitrile.

The so-called photopolymerization initiators are known from the literature. They are preferably mono- or dicarbonyl compounds, such as benzoin and derivatives thereof, in particular benzoin methyl ether, benzil and benzil derivatives, for example 4,4-oxydibenzil, and other dicarbonyl compounds, such as diacetyl, 2,3-pentanedione and α-diketo derivatives of norbornane and substituted norbornanes, metal carbonyls, such as pentacarbonylmanganese, or quinones, such as 9,10-phenanthrenequinone and naphthoquinone.

The coatings according to the invention in general contain 0.01 to 2 parts by wt., preferably 0.1 to 0.5 part by wt., of the initiator, per part by wt. of the condensation product.

It may be advantageous to add coactivators which accelerate the polymerization reaction to the coatings according to the invention. Known accelerators are, for example, amines, such as p-toluidine, dimethyl-p-toluidine, trialkylamines, such as trihexylamine, polyamines, such as N,N,N',N'-tetraalkylalkylenediamines, barbituric acid and dialkylbarbituric acids.

The coactivators are in general employed in an amount of 0.02 to 4 wt. %, preferably 0.2 to 1 wt. %, based on the amount of polymerizable compounds.

Possible further components for the coatings according to the invention are (meth)acrylic acid esters as comonomers. Esters of (meth)acrylic acid with 1- to 5-hydric alcohols having 2 to 30 carbon atoms may be mentioned as preferred.

Multi-functional (meth)acrylates, such as e.g. ethylene glycol di(meth)acrylate, glycerol di(meth)acrylate, glycerol tri (meth)acrylate, hexanediol di(meth)acrylate, neopentylglycol di(meth)acrylate and trimethylolpropane tri(meth) acrylate, are also particularly suitable. Epoxide (meth) acrylates, urethane (meth)acrylates and reaction products of polyols, diisocyanates and hydroxyalkyl (meth)acrylates (DE-A 3 703 120, DE-A 3 703 080 and DE-A 3 703 130) are also particularly suitable.

Mixtures of the various (meth)acrylic acid esters can likewise be employed.

The curable coatings according to this invention can furthermore contain up to 10 parts by wt. of customary additives, such as stabilizers, inhibitors or light stabilizers.

The coatings can be applied by known techniques, for example by brushing, spraying, atomizing, spin-coating or dipping. It is of course possible to establish the processing viscosity by addition of the abovementioned comonomers or by dilution with an inert solvent. Chlorinated aliphatics, ethyl acetate, acetone, butanone, toluene, xylene and methylene chloride, for example, are suitable as the inert solvent.

The coatings are suitable for numerous substrates, in particular for plastics. Examples of plastics which may be mentioned are polycarbonate and mixtures thereof ("blends") with other polymers, such as, for example, polystyrene, HIPS and ABS (acrylonitrile/butadiene/styrene copolymer).

It has been found that doped polycarbonate, which is employed e.g. in photoconductor drums as a charge transportation layer, can also be coated in an advantageous manner with the oligomeric condensation products according to the invention of aromatic tri- or tetracarboxylic acids and dihydroxyalkyl (meth)acrylates.

The thickness of the coatings according to the invention is not critical. It can be in the range from 0.1 μm to 500 μm, preferably 2 to 100 μm.

After curing, the coatings according to the invention are optically transparent and, compared with conventional acrylate coatings, show an improved resistance to thermal, mechanical or chemical stresses. They show an excellent adhesive strength on the surface of plastics. The high adhesive strength is also retained, in particular, if the coated plastic comes into contact with solvents.

Because of their good adhesion, the coatings according to the invention are also outstandingly suitable as bonding intermediate layers (primers). Thus, for example, the adhesive strength of predominantly inorganic scratch-resistant coatings, which are described e.g. in DE-A1-19603242 or DE-A1-4338361 ("Ormocers") can be improved decisively by application of an intermediate layer of the oligomeric condensation products according to the invention of aromatic tri- or tetracarboxylic acids and dihydroxyalkyl (meth) acrylates.

EXAMPLES

Example 1

Preparation of Condensation Product 1

A solution of 160.2 g (1.000 mol) glycerol monomethacrylate (monomer 1 from Table 1, Polyscience, Inc.) in 250 ml dry butanone is added dropwise to a solution of 210.57 g (1.000 mol) 1,2,4-benzenetricarboxylic acid anhydride chloride in 650 ml dry butanone none at −5° C., while stirring. After the mixture has been stirred at room temperature for sixteen hours, the pale solid which has been precipitated out is filtered off with suction and the filtrate is extracted under aqueous conditions and dried.

The resulting butanone solution contains the desired product (1) and can be employed directly for hydrolysis of the remaining anhydride groups. For this, 50 ml demineralized water are added to the solution and the mixture is stirred at room temperature for a period of 16 h.

After addition of 200 mg 2,6-di-tert-butylcresol, the resulting solution is concentrated to 327.7 g (87% of theoretical yield) of a yellowish viscous oil.

IRν=3400, 3200, 2900, 2600, 2400, 1720, 1640, 1500, 1440, 1420, 1380, 1295, 1240, 1175, 1125, 1075, 1020, 950, 865, 825, 760 cm$^{-1}$.

$^1$H-NMR (CDCl$_3$, 200 MHz); δ=8.55–7.8 (3H); 6.2 and 5.6 (each 1H); 5.8 (1H); 4.9–4.2 (4H); 1.9 (3H) ppm.

Molecular weight (HPLC): 1,100 daltons

Example 2
Preparation of Condensation Product 2

A solution of 160.2 g (1 mol) glycerol monomethacrylate in 250 ml butanone is added to a mixture of 218.12 g (1 mol) pyromellitic acid dianhydride, 222.2 g (2.2 mol) triethylamine and 2,200 ml butanone at room temperature, while stirring, and the mixture is heated at 50° C. for 3 h. The crude mixture is filtered and the filtrate is poured into ice-water, acidified with half-concentrated sulfuric acid for hydrolysis, and stirred for 30 min. The two phases are separated and the organic phase is washed again with water and dried over sodium sulfate.

IR:ν=3400, 2900, 2600, 2400, 1720, 1640, 1500, 1420, 1380, 1295, 1250, 1175, 1110, 1020, 950, 825, 770 cm$^{-1}$.

$^1$H-NMR (acetone-d$_6$, 200 MHz): δ=8.35–8.0 (2H); 6.1 and 5.6 (each 1H); 5.8 (1H), 4.7–4.2 (5H); 1.9 (3H) ppm.

Example 3
Preparation of Condensation Product 3

A solution of 160.2 g (1 mol) glycerol monomethacrylate in 250 ml butanone is added to a mixture of 268.18 g (1 mol) naphthalene-1,4,5,8-tetracarboxylic acid dianhydride, 222.2 g (2.2 mol) triethylamine and 2,200 ml butanone at room temperature, while stirring, and the mixture is heated at 50° C. for 3 h. The crude mixture is filtered and the filtrate is poured into ice-water, acidified with half-concentrated sulfuric acid for hydrolysis, and stirred for 30 min. The two phases are separated and the organic phase is washed again with water and dried over sodium sulfate.

IR: ν=3300, 3050, 2900, 2650, 2500, 1775, 1710, 1630, 1595, 1560, 1540, 1515, 1465, 1440, 1380, 1330, 1300, 1225, 1160, 1125, 1100, 1040, 950, 880, 820, 765, 700 cm$^{-1}$.

Example 4
Preparation of Condensation Product 4

10 mg 2,6-di-tert-butylcresol, 0.1 g triphenylphosphine and 5.83 g glycidyl methacrylate acrylate are added to a solution of 7.88 g 1,2,4-benzenetricarboxylic acid anhydride in 30 ml dry butanone. After stirring at 70° C. for 24 h, the crude solution is extracted under aqueous-acid conditions and dried.

The resulting butanone solution contains the desired product (4) and is concentrated to 12.19 g (89% of theoretical yield) of a slightly yellowish viscous oil.

$^1$H-NMR (CDCl$_3$, 200 MHz): δ=8.55–7.8 (3H); 6.2 and 5.6 (each 1H); 4.9–4.2 (5H) 1.9 (3H) ppm.

Molecular weight (HPLC): 1,500 daltons.

Example 5
Preparation of Condensation Product 5

The reaction described in Example 4 is repeated, 5.26 g glycidyl acrylate being used instead of 5.83 g glycidyl methacrylate.

The resulting butanone solution contains the desired product (5) and is concentrated to 9.46 g (72% of theoretical yield) of a yellowish viscous oil.

$^1$H-NMR (acetone-d$_6$, 200 MHz): δ=8.55–7.8 (3H); 6.6–5.8 (3H); 5–4.2 (5H) ppm.

Example 6
Investigation of the Photoreactivity With the Aid of Photo-DSC (Differential Scanning Calorimetry)

The following constituents are thoroughly mixed:

Example 6a (according to the invention):

5.0 g product according to Example 1

10 mg camphorquinone (photoinitiator)

25 mg p-dimethylaminobenzenesulfonic acid N,N-diallylamide (coactivator)

Example 6b (comparison):

5.0 g trimethylolpropane triacrylate (comparison: conventional commercial coatings acrylate)

10 mg camphorquinone 25 mg p-dimethylaminobenzenesulfonic acid N,N-diallylamide

The samples are irradiated at 30° C. in a DSC apparatus (differential scanning calorimetry) using a halogen lamp (75 W) with a heat protection filter. The heat flow under irradiation is recorded as a function of time. Samples of the same composition without a photoinitiator are employed as the reference. During the experiment, the apparatus is flushed with nitrogen. For the evaluation, the value t-Max is determined as a measure of the rate of reaction. T-max is the time from the start of irradiation until the maximum reaction (maximum heat flow) is reached. The smaller t-max, the greater the photoreactivity.

|  | t-max [min] |
| --- | --- |
| Example 6a (according to the invention) | 0.38 |
| Example 6b (comparison) | 2.0 |

The comparison illustrates that the photoreactivity of the oligomeric condensation products according to the invention of aromatic tri- or tetracarboxylic acids and dihydroxyalkyl (meth)acrylates is significantly greater than the photoreactivity of conventional acrylates employed for coatings.

Example 7
Coating of Polycarbonate

A coating solution is produced, with exclusion of light, by intensive mixing of the following constituents:

2.5 g butanone 2.5 g product according to Example 4

0.01 g camphorquinone 0.025 g p-dimethylaminobenzenesulfonic acid N,N-diallylamide (coactivator)

The coating solution is applied to a polycarbonate substrate (Macrolon) with a wet film thickness of 20 μm with the aid of a doctor blade. The film is dried at 40° C. for 30 min and then exposed to a halogen radiation source (100 watt) for 60 s. A transparent coating with good adhesion is obtained (cross-hatch test: 0/0).

Example 8

Coating of Polycarbonate

A coating solution is produced by intensive mixing of the following constituents:

- 2.5 g butanone
- 2.5 g product according to Example 4
- 0.025 g dibenzoyl peroxide The coating solution is applied to a polycarbonate substrate (Macrolon) with a wet film thickness of 20 μm with the aid of a doctor blade. The film is dried at 40° C. for 30 min and then cured in a drying cabinet at 100° C. for 15 min. A transparent coating with good adhesion is obtained (cross-hatch test: 0/0).

Example 9

Coating of ABS (acrylonitrile/butadiene/styrene copolymer)

A coating solution is produced, with exclusion of light, by intensive mixing of the following constituents:

- 1.5 g butanone
- 0.5 g product according to Example 1
- 0.5 g trimethylolpropane triacrylate
- 1.4 mg benzil dimethyl ketal The coating solution is applied to an ABS substrate with a wet film thickness of 100 μm with the aid of a doctor blade. The film is dried at 40° C. for 30 min and then exposed to a UV radiation source for 120 s. A transparent coating with good adhesion is obtained (cross-hatch test: 0/0). To investigate the resistance to alcohol, the coated substrate is immersed in ethanol for 24 h. No impairment of the adhesive strength (cross-hatch test: 0/0) or mechanical properties occurred.

What is claimed is:

1. A curable coatings comprising oligomeric condensation products of polyfunctional hydroxyalkyl acrylates of the formula (I)

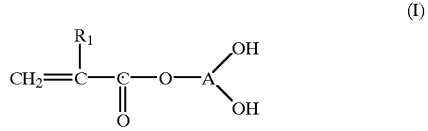
(I)

in which $R_1$ denotes hydrogen or methyl,

A denotes a trivalent aliphatic radical having 3 to 15 C atoms, and optionally containing additional OH groups and up to 5 ether bridges, and aromatic tri- or tetracarboxylic acid derivatives of the formula (II)

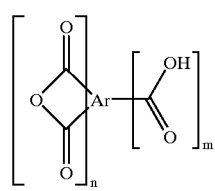
(II)

in which

Ar represents a benzene ring or a naphthalene ring, n denotes the integer 1 or 2, m denotes 0, 1 or 2.

2. The curable coating according to claim 1, wherein the radical A is chosen from the following compounds.

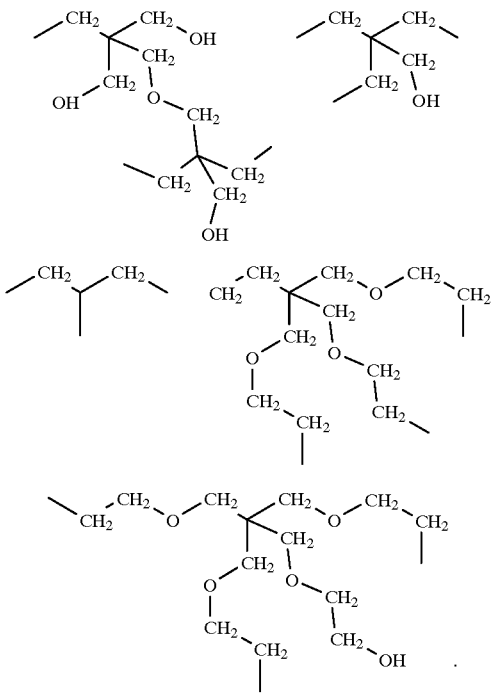

3. The curable coating according to claim 1, wherein the monomers of the formula (I) are chosen from the following compounds:

| Nr. | |
|---|---|
| 1 |  |
| 2 | |
| 3 | 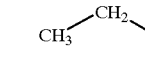 |

-continued

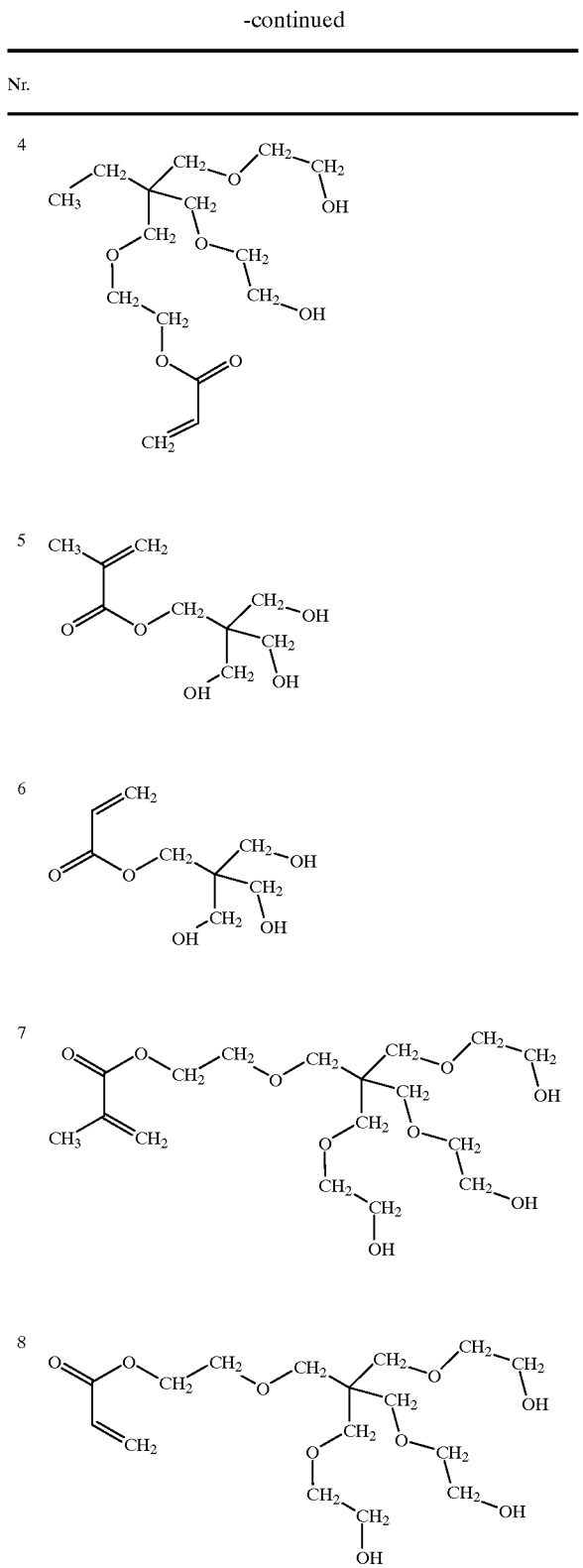

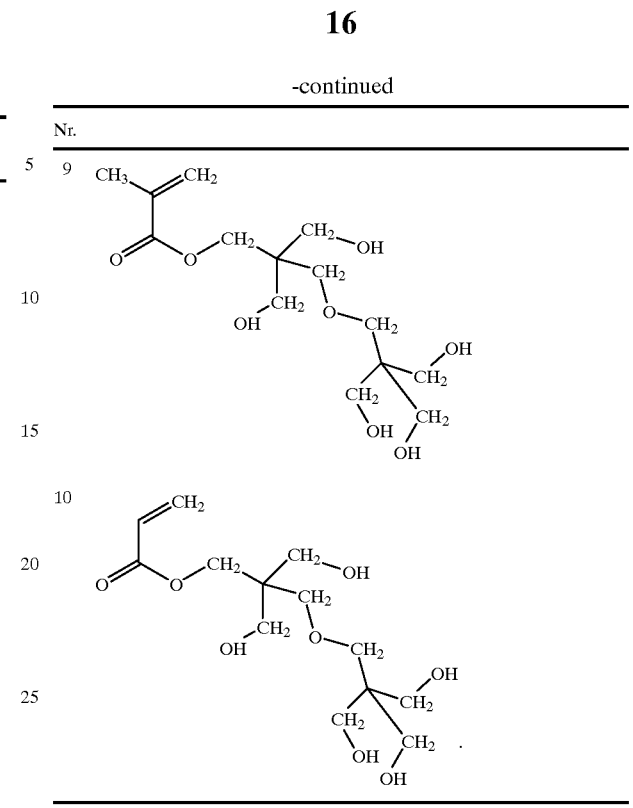

4. The curable coating according to claim 1, wherein the monomers of the formula (II) are chosen from the group consisting of trimellitic acid anhydride, 1,2,4-benzenetricarboxylic acid anhydride, 1,2,3-benzenetricarboxylic acid anhydride, 1,2,6-naphthalenecarboxylic acid anhydride, 2,3,6-naphthalenecarboxylic acid anhydride, 1,4,5-naphthalenecarboxylic acid anhydride and mixtures thereof.

5. The curable coating according to claim 1, wherein the oligomeric condensation products have a molecular weight of 300 to 10,000 daltons.

6. The curable coating according to claim 1 further comprising a mono- or dicarbonyl free radical initiator.

7. A plastic surface, coated by the curable coating according to claim 1.

8. The plastic surface according to claim 7, wherein the plastic is polycarbonate.

9. The plastic surface according to claim 7, wherein the plastic is a mixture of polycarbonate with another polymer selected from polystyrene, HIPS, ABS and a mixture thereof.

10. A method of coating plastics comprising applying the curable coating according to claim 1.

11. A method of coating a plastic selected from the group consisting of ABS, polycarbonate and a mixture thereof comprising applying the curable coating according to claim 1.

12. A method of priming a coating selected from an inorganic coating and an inorganic/organic coating comprising applying the curable coating according to claim 1.

* * * * *